United States Patent
John

(10) Patent No.: US 7,195,472 B2
(45) Date of Patent: Mar. 27, 2007

(54) APPARATUS AND METHOD FOR THE NON-DESTRUCTIVE SEPARATION OF HARDENED MATERIAL LAYERS FROM A FLAT CONSTRUCTION PLANE

(75) Inventor: Hendrik John, Hünxe (DE)

(73) Assignee: Envisiontec GmbH, Marl (DE)

( * ) Notice: Subject to any disclaimer, the term of this patent is extended or adjusted under 35 U.S.C. 154(b) by 647 days.

(21) Appl. No.: 10/127,997

(22) Filed: Apr. 23, 2002

(65) Prior Publication Data

US 2002/0153640 A1    Oct. 24, 2002

(30) Foreign Application Priority Data

Apr. 23, 2001    (DE) ................................ 101 19 817

(51) Int. Cl.
*B29C 35/08*    (2006.01)

(52) U.S. Cl. ..................................... 425/89; 425/174.4

(58) Field of Classification Search .................. 425/89, 425/174.4; 264/316, 401
See application file for complete search history.

(56) References Cited

U.S. PATENT DOCUMENTS

| | | | |
|---|---|---|---|
| 5,122,441 A | 6/1992 | Lawton et al. ............... | 430/320 |
| 5,143,817 A * | 9/1992 | Lawton et al. ............... | 264/401 |
| 5,171,490 A | 12/1992 | Fudim .......................... | 264/22 |
| 5,192,559 A * | 3/1993 | Hull et al. ..................... | 425/89 |
| 5,271,882 A * | 12/1993 | Shirahata et al. ........... | 264/509 |
| 5,391,072 A | 2/1995 | Lawton et al. ............. | 425/174.4 |
| 5,447,822 A | 9/1995 | Hull et al. .................. | 438/396 |
| 5,529,473 A | 6/1996 | Lawton et al. ........... | 425/174.4 |
| 5,824,252 A * | 10/1998 | Miyajima .............. | 264/272.17 |
| 6,027,682 A * | 2/2000 | Almquist et al. ........... | 264/401 |
| 6,563,207 B2 * | 5/2003 | Shinma ....................... | 257/687 |
| 6,652,799 B2 * | 11/2003 | Seng et al. ................. | 264/511 |

FOREIGN PATENT DOCUMENTS

DE    41 25 534 A1    2/1993
DE    93 19 405.6    5/1994

OTHER PUBLICATIONS

Burns, M., "Automated Fabrication—Improving Productivity in Manufacturing," 1993 (ISBN 0-13-119462-3), pp. 40-49.

* cited by examiner

*Primary Examiner*—Yogendra N. Gupta
*Assistant Examiner*—Emmanuel S. Luk
(74) *Attorney, Agent, or Firm*—George W. Neuner; Edwards Angell Palmer & Dodge LLP

(57) ABSTRACT

An apparatus and a method for the separation of a material layer (4) hardened on a flat plane (2) serving as a reference by means of a flexible, elastic separating layer (1) arranged between plane and material layer and designed in the form of a film or a gel-like material, are provided.

20 Claims, 5 Drawing Sheets

APPARATUS AND METHOD FOR THE NON-DESTRUCTIVE SEPARATION OF HARDENED MATERIAL LAYERS FROM A FLAT CONSTRUCTION PLANE

The invention concerns an apparatus and a method for the non-destructive separation of hardened material layers from a flat construction plane.

For building up three-dimensional objects in layers from "light-hardening" photopolymers, the most varied methods are provided in the literature, see "Automated Fabrication—Improving Productivity in Manufacturing" by Marshall Burns, 1993 (ISBN 0-13-119462-3).

Figure 1A:
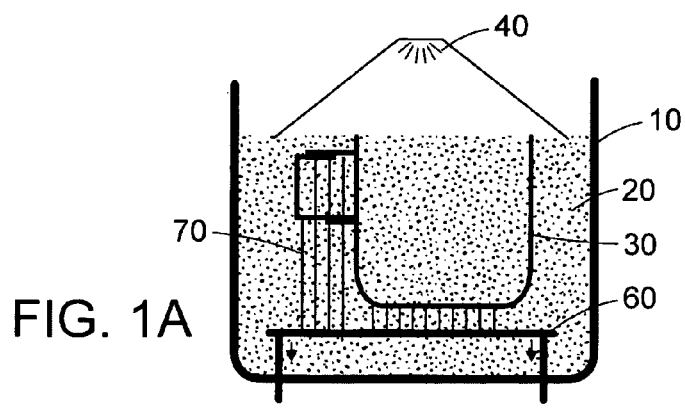
Figure 1B:
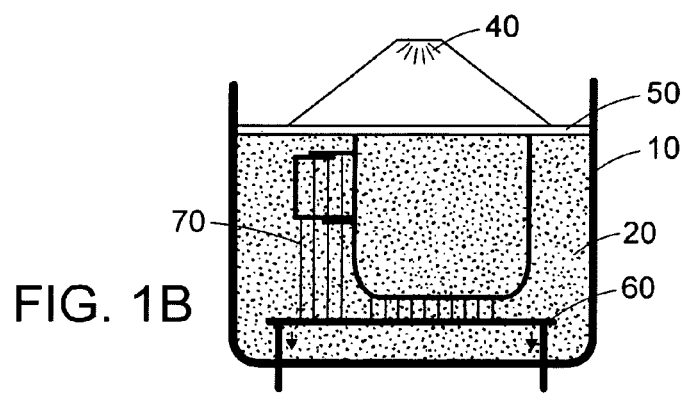
Figure 1C:
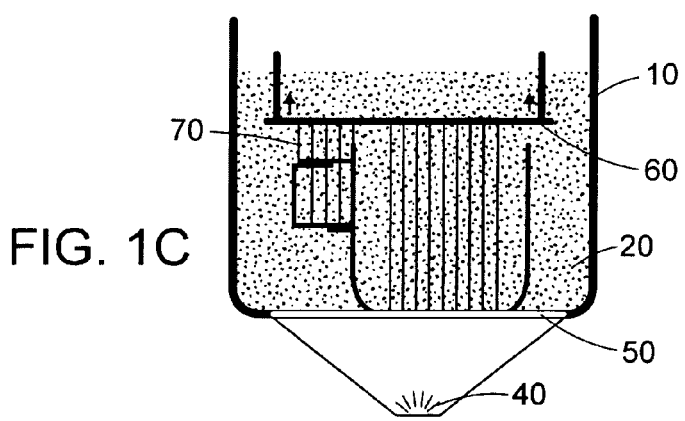
Figure 1D:
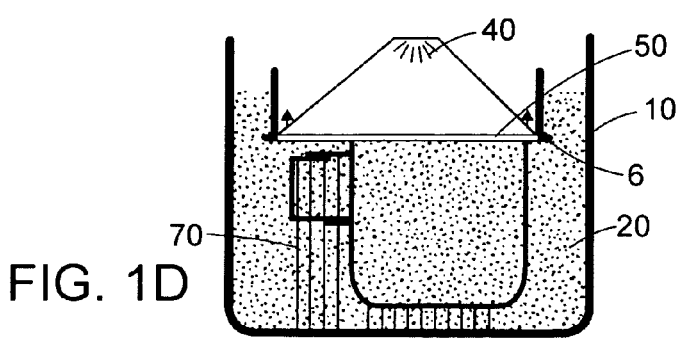

Among the methods described are three variants in which the layer to be produced is selectively exposed on a transparent reference plane, a so-called "contact window", through the latter, and polymerised/hardened. The three variants are sketched in FIGS. 1a to c. In the figures, 10 denotes a container, 20 a liquid polymerisable material which is in the container, 30 an object to be formed, 40 a light source with a mask producing device for projecting a cross-sectional image, 50 the contact window, 60 a carrier platform for the object and 70 supports for the object.

The method described here below is a further development of the method described in utility model DE-U-93 19 405.6 "Apparatus for manufacturing a three-dimensional object (model) on the principle of photohardening".

To be able to separate the hardened material layer from the contact window/reference plane, in patents U.S. Pat. No. 5,171,490 (Efrem V. Fudim) and DE 41 25 534 A1 (EOS GmbH, Electro Optical Systems) is described a solution for a separating layer by means of a thin film of flexible plastic.

In selective exposure by laser or mask in differently shaped surface structures directly on one side of a transparent reference plane opposite the source of radiation, the resin polymerises in direct contact with this reference plane. The problem lies in separating the layer, which is constructed differently in its surface structure, from the transparent reference plane in such a way that it remains stuck to the previously produced layers, and both the resulting layer and the already produced part of the object is not deformed or even destroyed or torn off by the separating force and ultimately the object produced layer by layer remains stuck to the carrier plate throughout the building process.

Due to the use of a separating film proposed in the patents described above, the so-called peeling effect is used, that is, the film peels off the hardened polymer layer regularly due to the separating process, with the result that the separating forces are reduced in the Z direction because of force vector resolution.

If the film serves as a separating layer from the transparent reference plane and if only the object to be built is moved away from the reference plane for the purpose of separation, the path of separation is much greater than the following layer thickness which is actually to be built because, due to the elastic tension in the film built up during the separating process, the necessary separating force must be built up for the actual peeling process. This moving or separating process costs extra time which must in each case be added to the polymerisation time of a structural layer and so essentially determines the total building time of the building process. Moreover there is a risk that the film will be permanently plastically deformed, crease/corrugate and so a flat surface will no longer be formed. Here, depending on the surface of the layer polymerised at the transparent reference plane, an adhesion force between object or hardened layer and transparent reference plane is to be overcome. Since uneven surface structures are involved as a rule, the adhesion forces applied are also unevenly distributed.

It is the object of the invention to provide a solution for a separating layer and/or a separating method which, independently of
a) the hardened surface area,
b) the formation of the surface structure of the hardened layer,
c) the hardening material used, allows easy separation of the hardened layer from the transparent reference plane, so that the layer currently being hardened in conjunction with the layer structure already produced is preserved in its original form, the necessary path of movement for separation is minimised and so the building time for each layer is reduced and at the same time the process is stable in the long term.

This object is achieved by an apparatus or a method with the characteristics according to claim 1 or 10 respectively. Developments are provided in the subsidiary claims.

Figure 2:
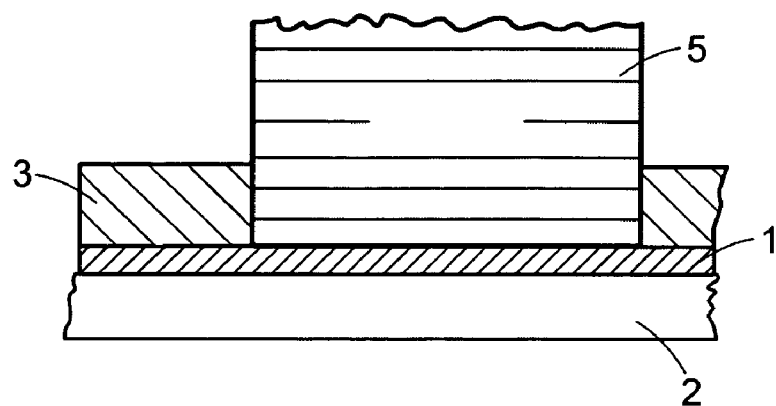
Figure 3A:
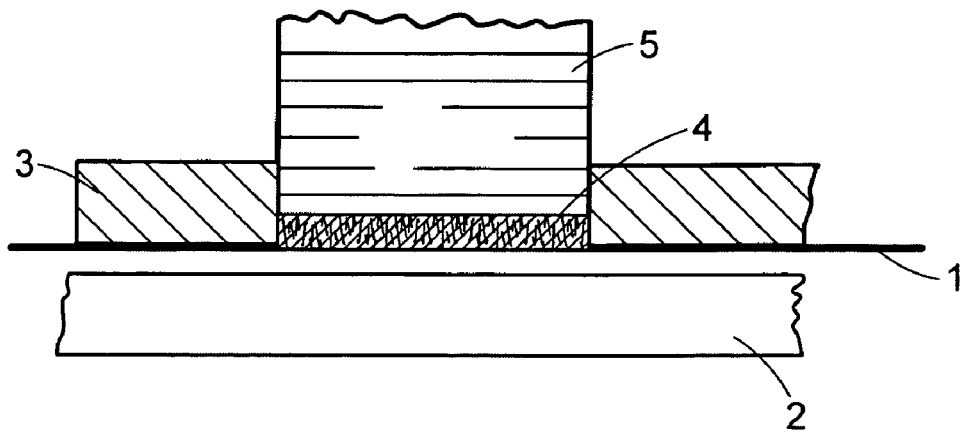
Figure 3B:
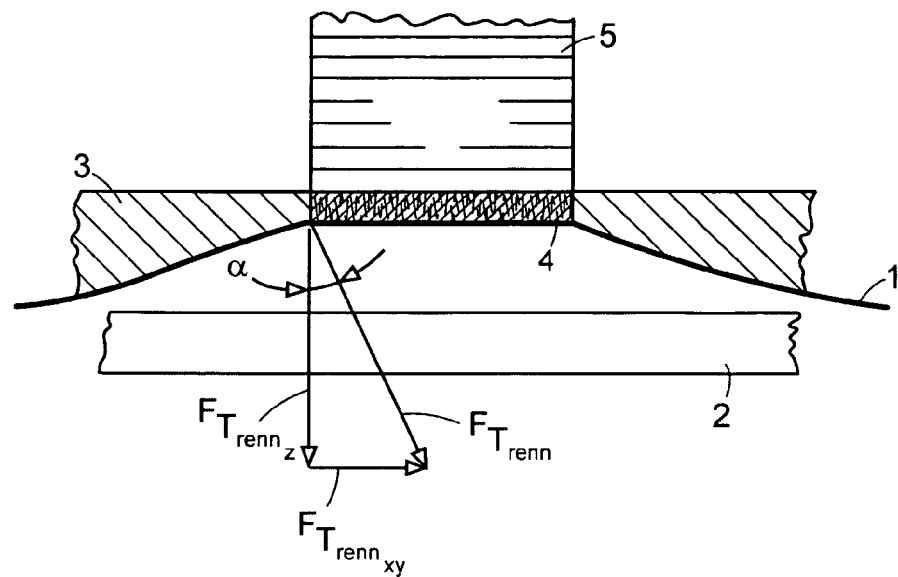
Figure 3C:
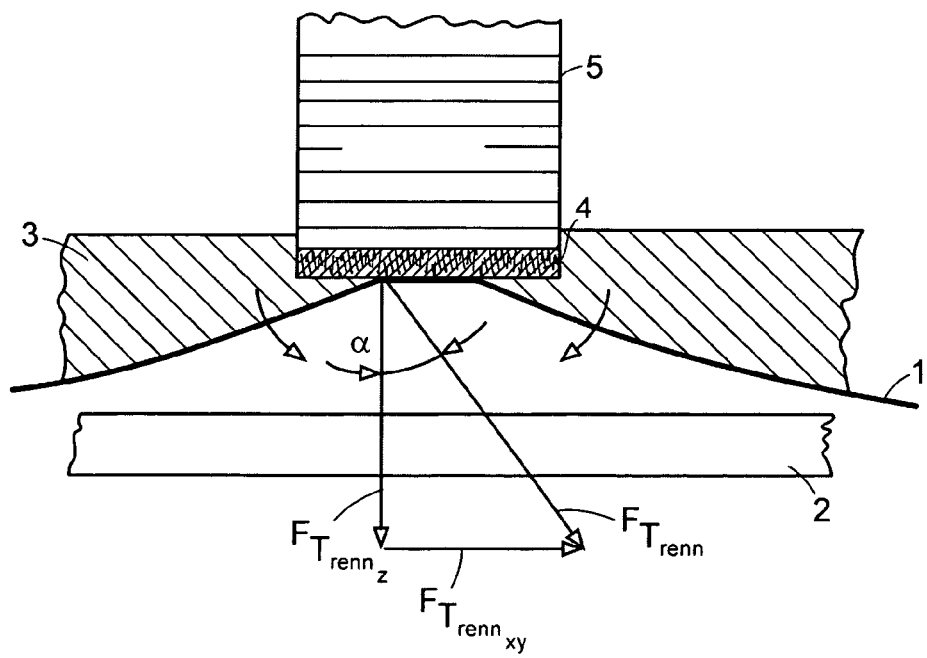
Figure 4:
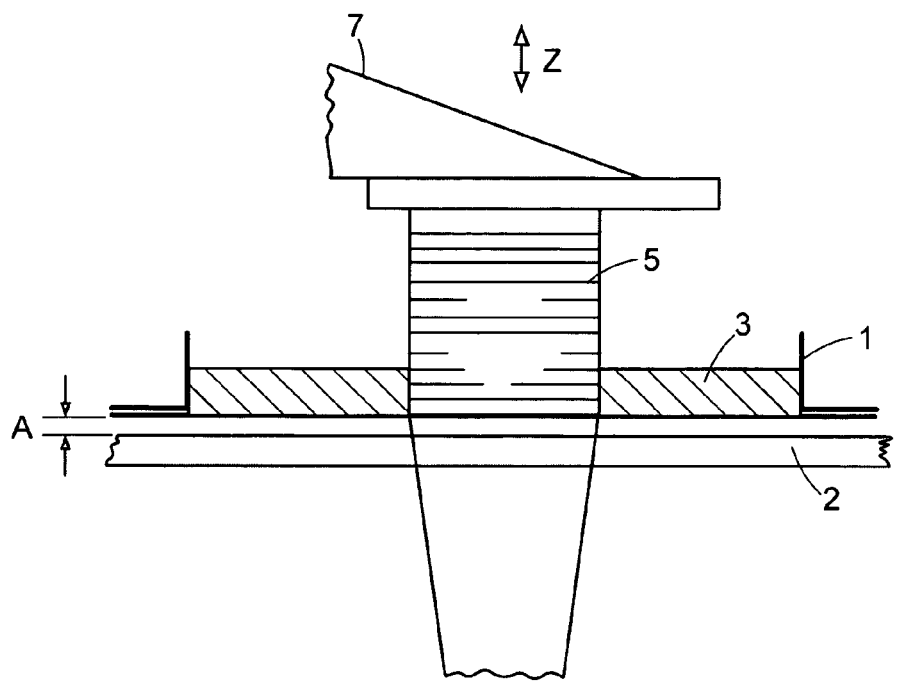
Figure 5A:
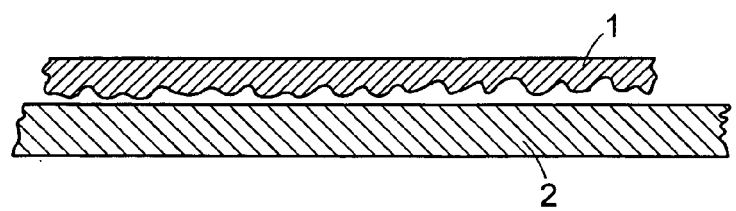
Figure 5B:
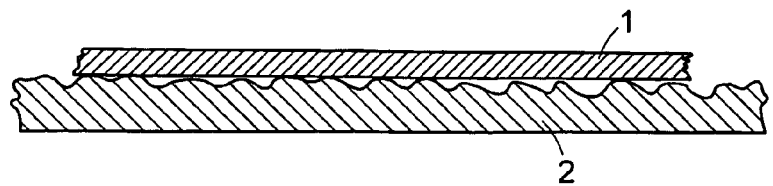
Figure 6:
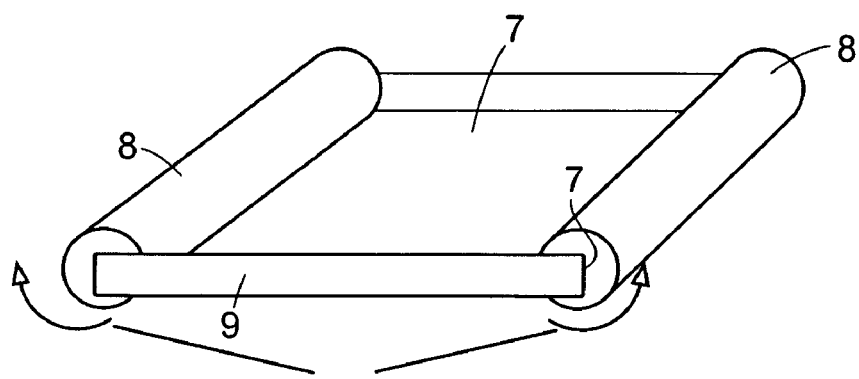
Figure 7:
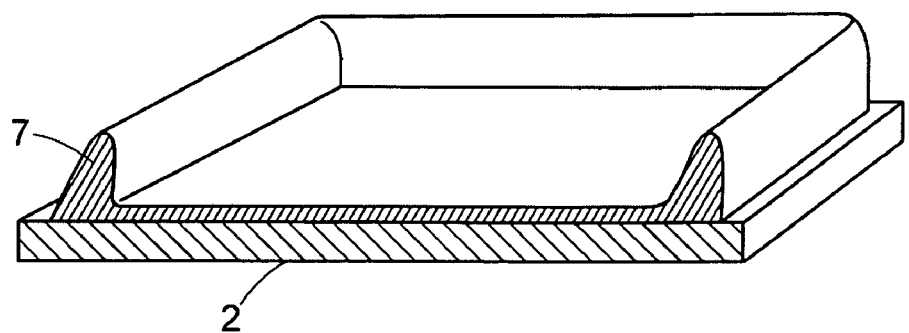

Further characteristics and suitabilities are apparent from the description of practical examples with the aid of the figures. The figures show:

FIG. 1: the state of the art;

FIG. 2: a transparent bottom plate 2 with separating layer 1 provided thereon, liquid photopolymer 3 and the object 5;

FIG. 3a: an arrangement as in FIG. 2, wherein the separating layer 1 is designed as a transparent film which is arranged between the bottom plate and the photopolymer;

FIGS. 3b to 3c: the operation of detachment of the already solidified layer 4 from the separating layer;

FIG. 4: a schematic view of an apparatus for a rapid prototyping method by means of photohardening with a separating layer 1 recessed to form a polymerisation trough and an object support 7 movable in the z-direction;

FIGS. 5a and 5b: schematic views to illustrate the avoidance of adhesion of the film or separating layer 1 to the bottom plate 2;

FIG. 6: a schematic view of mounting the elastic film or separating layer 1 on rotatably mounted rollers 8; and FIG. 7: a schematic view of a separating layer 1 recessed to form a polymerisation trough.

An elastic, transparent/translucent material is used as the separating layer. The separating layer in this method can A) be arranged between material and bottom plate in the form of a transparent film, in such a way that the separating layer undergoes no bonding to the transparent bottom plate (FIG. 2);

B) be applied to the transparent bottom plate as a direct coating, so that an elastic separating layer is formed on the bottom plate (e.g. silicone).

A): Film as Separating Layer

A (transparent) film which is arranged between the bottom plate and the photopolymer is selected as the separating layer (FIG. 3a).

As the film does not adhere to the bottom plate and so does not form a solid, non-deformable unit with the bottom plate, it can be deformed elastically during the separation process, so that a so-called "peeling" or "pulling-off" process is caused at the hardened layer. Due to the elastic deformation of the separating layer or the pulling-off process, displacement/vector resolution of the separating force vector takes place, substantially facilitating the separation process (see FIGS. 3b–c). This process can be further reinforced by applying a partial pressure or vacuum to the gap between film and bottom plate and also has the advantage that the hardened layer must be moved away from the construction plane only by the amount of the following layer thickness.

The material of the film can be selected for the separation process or optimised according to the photopolymer used.

An additional "anti-adhesion" effect and slight inhibition of radical polymerisation with acrylate systems can additionally be caused e.g. by the use of FEP, PTFE or PFA films.

The film can be exchanged without problems in case of damage or wear.

To improve maintenance or cleaning of the apparatus, the film in conjunction with an additional frame made of the same or different material can be structured into a kind of "basin" (see FIG. 4), which with the remaining material (photopolymer) can easily be removed and disposed of in hardened form.

If a film of high-elasticity material e.g. latex or silicone rubber is used, in addition a shearing effect can be used for the separation process. This effect is brought about by stretching the film in the reference plane during the separation process. Due to the combination of peeling and shearing effects, separation is facilitated and the path of separation is limited to the distance of the next layer thickness.

The arrangement in FIG. 4 shows an apparatus for a rapid prototyping method by means of photohardening, wherein a liquid material (light-hardening plastic) is located in a basin with a transparent bottom plate (e.g. made of glass) and a similarly transparent film mounted over it. The film is in this case mounted in the edge region of the basin between frame and bottom plate in such a way that a gap between bottom plate and film is ensured, which would prevent adhesion of the film in the stretched state to the bottom plate and allows inflow and outflow of air to and from the gap between film and bottom plate.

Over the basin is located a carrier plate which can be raised and lowered in a vertical direction to the bottom plate by a linear unit.

For the first layer, the carrier plate is submerged in the material to such an extent that depth hardening of the selectively exposed photopolymer (e.g. by multimedia projector or laser) ensures firm bonding to the lower side of the carrier plate.

If the carrier plate together with the hardened layer(s) is lifted, the film comes away from the lower side of the hardened material layer by a kind of peeling/pulling off process if the force vectors between hardened material layer and film for separation exhibit a large enough horizontal component ($F_{Trenn\ XY}$) (FIGS. 3a–c).

The horizontal force component ($F_{Trenn\ XY}$) comes about by the fact that, when the object is lifted, the film between the frame mounting and the region adhering to the hardened material layer is elastically deformed or stretched and, with the varying setting angle α of the film relative to the material layer, the direction of application of force also moves out of the vertical.

The carrier plate must in this case be lifted to such an extent that the film can completely separate from the hardened surface and return to its original state by subsequent relaxation.

Fresh, liquid material for the following layer to be hardened is automatically entrained by the growing wedge-shaped gap between film and hardened layer during the separation process.

An alternative for preventing adhesion of the film to the bottom plate and ensuring supply of air and hence preventing the film from being sucked against the plane/bottom plate can be transposed by deliberately produced surface roughness or structuring a) on the lower side of the film (FIG. 5a) by micro/nano-structuring or b) on the side of the bottom plate oriented towards the film (FIG. 5b), e.g. by slight etching of the glass surface or suitably rough coatings (ITO coating).

If the film e.g. attains sufficient inherent rigidity or is suitably stretched, under certain circumstances the transparent reference plate can be completely dispensed with.

In a further embodiment, film and transparent reference plate are arranged in such a way that between plate and film is formed a flat chamber which is filled with a liquid or gaseous medium. A partial pressure can be applied to the chamber to speed up the separation/peeling process and reduce lifting/lowering of the carrier plate together with object during the separation process to a minimum, namely the following layer thickness.

The partial pressure or vacuum is applied when the object is lifted to the next layer thickness in order to force elastic deformation of the film and increase the setting angle α of the film in the edge region outside the contour of the adhering hardened surface until the peeling process begins.

The partial pressure or vacuum is applied until the film has completely come away from the hardened layer and relaxed.

To avoid the problem of plastic deformation and creep of the film in continuous operation, a high-elasticity film which is stretched during the separation process can be used. For this purpose the film is mounted e.g. over two opposed rollers (see FIG. 6) and stretched by "rolling on" on both sides and returned to the original state by subsequent "unrolling". Due to the resulting uniform stretch of the film in opposite directions, the film thickness temporarily tapers and additional shearing forces occur.

The mounting of the film between the rollers held in a frame can be such that a basin is formed, in which the liquid photopolymer is located (see FIG. 6).

An alternative to the film is offered by the application of an optically transparent silicone layer to the glass plate oriented towards the photopolymer. During the separation process the silicone layer facing towards the photopolymer behaves in principle like the film, i.e. in the whole silicone layer elastic deformation takes place and the internal stresses in the silicone layer lead to the regions of the silicone layer which adhere to the hardened material layer being peeled off.

It is important here that good adhesion of the silicone layer to the bottom plate (glass plate) is ensured, or the adhesion between silicone layer and bottom plate is greater by a multiple than the adhesion between silicone layer and hardened material.

By recessing a frame from the same silicone material, a basin is also formed to hold the liquid photopolymer (see FIG. 7).

The methods described above with film or silicone are not confined to the arrangement described above. Their use is also conceivable in the variants shown, see FIGS. 1a–c, as well as e.g. in the arrangement from utility model DE-U-93 19 405.6 "Apparatus for manufacturing a three-dimensional object (model) on the principle of photohardening".

The invention claimed is:

1. An apparatus for the separation of a material layer that is hardened on a flat plane, which serves as a reference, the apparatus comprising:

a layer of a flexible, elastic separating film arranged between the flat plane and the material layer, wherein the film does not adhere to the plane and wherein a gaseous or liquid medium can flow between the film and the plane, either wherein the flat plane has a surface facing the film, and the surface comprises a certain surface roughness to ensure supply or removal of the medium; or wherein the film has a surface facing the plane, the surface comprising a microstructure to ensure supply or removal of the medium.

2. The apparatus according claim 1, the apparatus further comprising a frame in which the film is mounted, the frame and film in combination forming a unit and serving as a holding basin for a material for forming the hardened layer.

3. The apparatus according to claim 2, wherein the film is an exchangeable component.

4. The apparatus according to claim 1, wherein the film comprises a flexible thin glass.

5. The apparatus according to claim 1, wherein the reference plane comprises a transparent plate, and the separating layer also is transparent.

6. An apparatus for the separation of a material layer that is hardened on a flat plane, which serves as a reference, the apparatus comprising:

a layer of a flexible, elastic separating film arranged between the flat plane and the material layer, wherein the film does not adhere to the plane and wherein a gaseous or liquid medium can flow between the film and the plane, the apparatus further comprising a chamber between the plane and the film and means for providing negative pressure to the chamber to effect separation of said flexible, elastic separating film from a hardened material layer.

7. The apparatus according to claim 6, wherein said means for providing negative pressure elastically deforms the film and increases a setting angle α of the film in an edge region outside the contour of the adhering hardened surface until a peeling process begins to separate the film from the hardened layer.

8. The apparatus according to claim 7, the apparatus further comprising a carrier plate for carrying an object comprising the hardened layer and means for lifting/lowering of the carrier plate together with object, thereby providing separation of the film and hardened layer by applying negative pressure to reduce a distance of lifting/lowering of the carrier plate together with object during the separation process to a distance that is less than or equal to a following layer thickness.

9. An apparatus for the separation of a material layer that is hardened on a flat plane, which serves as a reference, the apparatus comprising a flexible, elastic separating layer arranged between plane and material layer, the elastic separating layer comprising a gel-like elastic material that is applied directly to the plane.

10. The apparatus according to claim 9, wherein the gel-like layer has an adhesion to the plane that is greater by a multiple than adhesion of the gel-like layer to the hardened material layer.

11. The apparatus according to claim 9, wherein the gel-like separating layer is structured and arranged to elastically deform during a separation of the separating layer from the hardened material layer and to return to its original state after complete detachment from the hardened material layer.

12. The apparatus according to claim 9, further comprising a lateral frame that, in combination with the plane, forms a kind of holding basin for nonhardened material on a side of the gel-like separating layer.

13. The apparatus according to claim 12, wherein the lateral frame is formed from the same gel-like material as the separating layer.

14. The apparatus according to claim 12, wherein the holding basin comprises a frame and a bottom plate and together the holding basin and the gel-like separating layer are an exchangeable unit.

15. The apparatus according to claim 9, wherein the reference plane comprises a transparent plate, and the separating layer also is transparent.

16. An apparatus for the separation of a material layer that is hardened on a flat plane, which serves as a reference plane, the apparatus comprising:

a flexible, elastic separating layer of a high-elasticity film arranged between plane and material layer;

a basin formed above said flexible, elastic separating layer, wherein a photohardening, liquid material for forming the hardened material layer is located in said basin such that said photo hardening, liquid material is allowed to be automatically entrained in the gap between the film and the hardened layer during the separation process; and means for stretching the film in the reference plane when separating the film and the material layer.

17. The apparatus according to claim 16, further comprising two opposed rollers in which the film is mounted, wherein the film can be stretched by opposite rotation of the rollers.

18. The apparatus according to claim 17, further comprising a frame in which the rollers are held, wherein the frame together with the mounted film form a kind of holding basin for a liquid photopolymer.

19. The apparatus according to claim 18, wherein the holding basin comprising the frame, rollers and mounted film is an exchangeable unit.

20. The apparatus according to claim 16, wherein the reference plane comprises a transparent plate, and the separating layer also is transparent.

* * * * *